US010599754B2

(12) United States Patent
Antipa et al.

(10) Patent No.: US 10,599,754 B2
(45) Date of Patent: Mar. 24, 2020

(54) CONTEXT EDITING WITHOUT INTERFERING WITH TARGET PAGE

(71) Applicant: ADOBE INC., San Jose, CA (US)

(72) Inventors: Damien Antipa, Saint-Louis (FR); Gilles Knobloch, Wahlbach (FR); Artur Kudlacz, Allschwil (CH)

(73) Assignee: Adobe Inc., San Jose, CA (US)

( * ) Notice: Subject to any disclaimer, the term of this patent is extended or adjusted under 35 U.S.C. 154(b) by 431 days.

(21) Appl. No.: 14/107,153

(22) Filed: Dec. 16, 2013

(65) Prior Publication Data

US 2015/0169518 A1 Jun. 18, 2015

(51) Int. Cl.
*G06F 17/24* (2006.01)
*G06F 16/958* (2019.01)

(52) U.S. Cl.
CPC .......... *G06F 17/24* (2013.01); *G06F 16/958* (2019.01)

(58) Field of Classification Search
CPC ...... G06F 17/24; G06F 17/218; G06F 17/227; G06F 17/2247; G06F 17/3089; H04L 67/02
See application file for complete search history.

(56) References Cited

U.S. PATENT DOCUMENTS

| 8,522,134 B1 * | 8/2013 | Zetlen | G06F 17/218 |
| | | | 715/234 |
| 2005/0216856 A1 * | 9/2005 | Matti | G06F 17/30905 |
| | | | 715/768 |
| 2006/0212803 A1 * | 9/2006 | Arokiaswamy ... | G06F 17/30893 |
| | | | 715/201 |
| 2006/0248442 A1 * | 11/2006 | Rosenstein | G06F 17/24 |
| | | | 715/205 |
| 2009/0055755 A1 * | 2/2009 | Hicks | G06F 17/3089 |
| | | | 715/760 |

OTHER PUBLICATIONS

Adobe, "Adobe—Granite Reference," copyright Dec. 6, 2012, published by adobe.com, https://docs.adobe.com/docs/en/cq/5-6-1/touch-ui/granite-reference.html.*
Android Developers, "Android Developer—DialogPreference," copyright Jan. 4, 2012, published by developer.android.com, https://web.archive.org/web/20120104043843/http://developer.android.com/reference/android/preference/DialogPreference.html.*
Adobe, "Adobe—Granite Reference," copyright Dec. 6, 2012, published by adobe.com, https://docs.adobe.com/docs/en/cq/5-6-1/touch-ui/granite-reference.html, pp. 1-19.*

(Continued)

*Primary Examiner* — Kavita Padmanabhan
*Assistant Examiner* — Warren Campbell, Jr.
(74) *Attorney, Agent, or Firm* — Shook, Hardy & Bacon, L.L.P.

(57) ABSTRACT

An editable version of a first web page may be created by first forming a second web page having the first web page as an inline frame. Then an outer frame of the second web page can be created, the outer frame designed to cause a browser rendering the second web page to create objects in the outer frame placed over corresponding objects in the first web page in the inline frame such that user attempts at interaction with the corresponding objects in the first web page are intercepted by the objects in the outer frame.

17 Claims, 8 Drawing Sheets

(56) References Cited

OTHER PUBLICATIONS

Android Developers, "Android Developer—DialogPreference," copyright Jan. 4, 2012, published by developer.android.com, https://web.archive.org/web/20120104043843/http://developer.android.com/reference/android/preference/DialogPreference.html , pp. 1-9.* w3schools, "HTML DOM Document Objects," copyright Jul. 5, 2013, w3schools.com, https://web-beta.archive.org/web/20130705074503/https://www.w3schools.com/jsref/dom_obj_document.asp, pp. 1-2.* w3schools, "HTML DOM Frame-(frame content Document Property," copyright Feb. 21, 2011, w3schools.com, https://web-beta.archive.org/web/20110221090728/https://www.w3schools.com/jsref/prop_frame_contentdocument.asp, pp. 1-2.*

* cited by examiner

CONTEXT EDITING WITHOUT INTERFERING WITH TARGET PAGE

FIELD

The present disclosure relates generally to web page editing. More specifically, the present disclosure relates to context editing without interfering with a target page document object model (DOM) structure.

BACKGROUND

A web content management system is a software application that allows a user to manage content for digital experiences. A common use of such software is for a user, which may be a company or service, to edit an existing web page and provide the edited web page to customers. This is typically performed using a web content management tool. An example might be to edit web pages served from a third-party application or web server so that the company or service logo appears on all pages, although the editing can also be much more complex, including modifying and moving elements of the web page. Such an authoring capability may be provided to a user in a browser by injecting scripting language code, such as JavaScript, for the functionality of editing and style sheets to enable styling the editor's controls. This type of editing, however, may cause the side effect of causing the layout of the modified web page to break or display in a different way than intended.

BRIEF DESCRIPTION OF DRAWINGS

The present disclosure is illustrated by way of example and not limitation in the figures of the accompanying drawings, in which like references indicate similar elements and in which:

FIG. 4 is a screen capture illustrating an editable web page, in accordance with an example embodiment.

FIG. 5 is a screen capture illustrating an editable web page being viewed in a non-editing mode.

DETAILED DESCRIPTION

In an example embodiment, a content management system is provided that allows a user to manipulate a web page without interfering with the web page's layout. Any component-based content can be edited and manipulated through a single interface. The content management system (also known as a web content management system) may be contained in a broader web application. This provides the advantage that any editing that occurs when the web page is rendered can be performed without concern for whether the editing will wind up crashing the browser or causing the web page to otherwise be non-functional.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

For purposes of this disclosure, a component-based system shall be defined as a system in which the elements of a web page are organized into components. A component is an encapsulated piece of code that performs some function for the web page or provides a rendition for a piece of the web application's overall rendition. Every object on the web page, including components and images, has a uniform resource locator (URL) that is unique to the object.

Additionally, an inline frame shall be defined as a web page that is embedded within another web page. An outer frame shall be defined as a portion of a web page that is not considered to be an inline frame.

Figure 1:
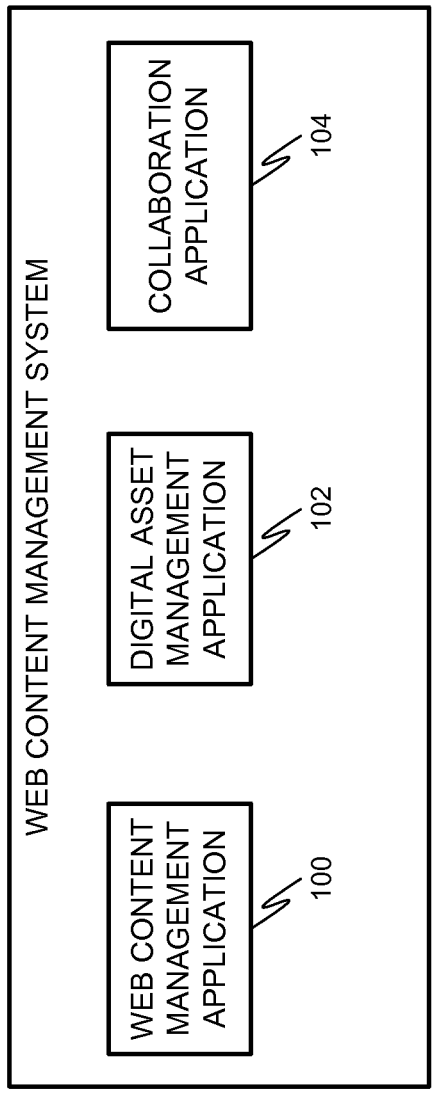
FIG. 1 is a block diagram illustrating a web content management system in accordance with an example embodiment.

FIG. 1 is a block diagram illustrating a web content management system in accordance with an example embodiment. The web content management system includes a web content management application 100, a digital asset management application 102, and a collaboration application 104. In an example embodiment, the methods and systems described herein to perform web content management in a manner that does not interfere with a web page's layout may be performed in the web content management application 100.

A DOM structure, such as a tree, represents the layout of a web page. A web page is interpreted by parsing the underlying code, typically written in combinations of hypertext markup language (HTML), cascading style sheets (CSS), and JavaScript (although other combinations are possible as well), using a DOM parser. The DOM parser forms a data structure, such as a tree, with the topmost node being the document object. The browser then uses this data structure in actually rendering the web page. The DOM structure is also the way JavaScript transmits the state of the browser in HTML pages.

In an example embodiment, instead of injecting JavaScript or other scripting functions on a web page directly, an editor page with a subframe (such as an iframe) is provided and minor scripting functions may be injected into the subframe. This subframe may then be used as a visible portion of the web page, so that if there are any functions that might cause a crash.

In an example embodiment, the web page and subframe are designed in a component-based system. A component-based system is one in which the elements of a web page are organized into components. A component is an encapsulated piece of code that performs some function for the web page or provides a rendition for a piece of the web application's overall rendition. Every object on the web page, including components and images, has a uniform resource locator (URL) that is unique to the object.

In an example embodiment, the web page is designed using a representational state transfer (REST) interface. REST is an architectural style that abstracts the architectural elements within a distributed hypermedia system. REST ignores the details of component implementation and protocol syntax in order to focus on the roles of components, the constraints upon their interaction with other components, and their interpretation of significant data elements. REST is a commonly used web application program interface (API) design model. In the REST model, the web application is presented with a network of web pages, and the user progresses through the application by selecting links (state transitions), resulting in the next page (representing the next state of the application) being transferred to the user and rendered for their use. REST may be used to access and manipulate the components on the web page and subpage.

When the web page is to be edited, the editor may load the web page into the subframe and render it, thereby injecting data attributes of the components and the paths (e.g., URLs) for the components into the subframe in order to identify them as components in the DOM tree.

Components may also be nested within other components, and the entire component configuration is then stored in the subframe.

In the main page, overlays are generated for each of the edited components. The overlays are rendered using the data attributes for the component stored in the editor's frame. This essentially results in the original page being rendered completely unmanipulated, and then the user interface is used to modify components being rendered on top of their corresponding original components. Thus, the user only sees a page having modified components, even though the original components were rendered underneath those modified components.

Figure 2:
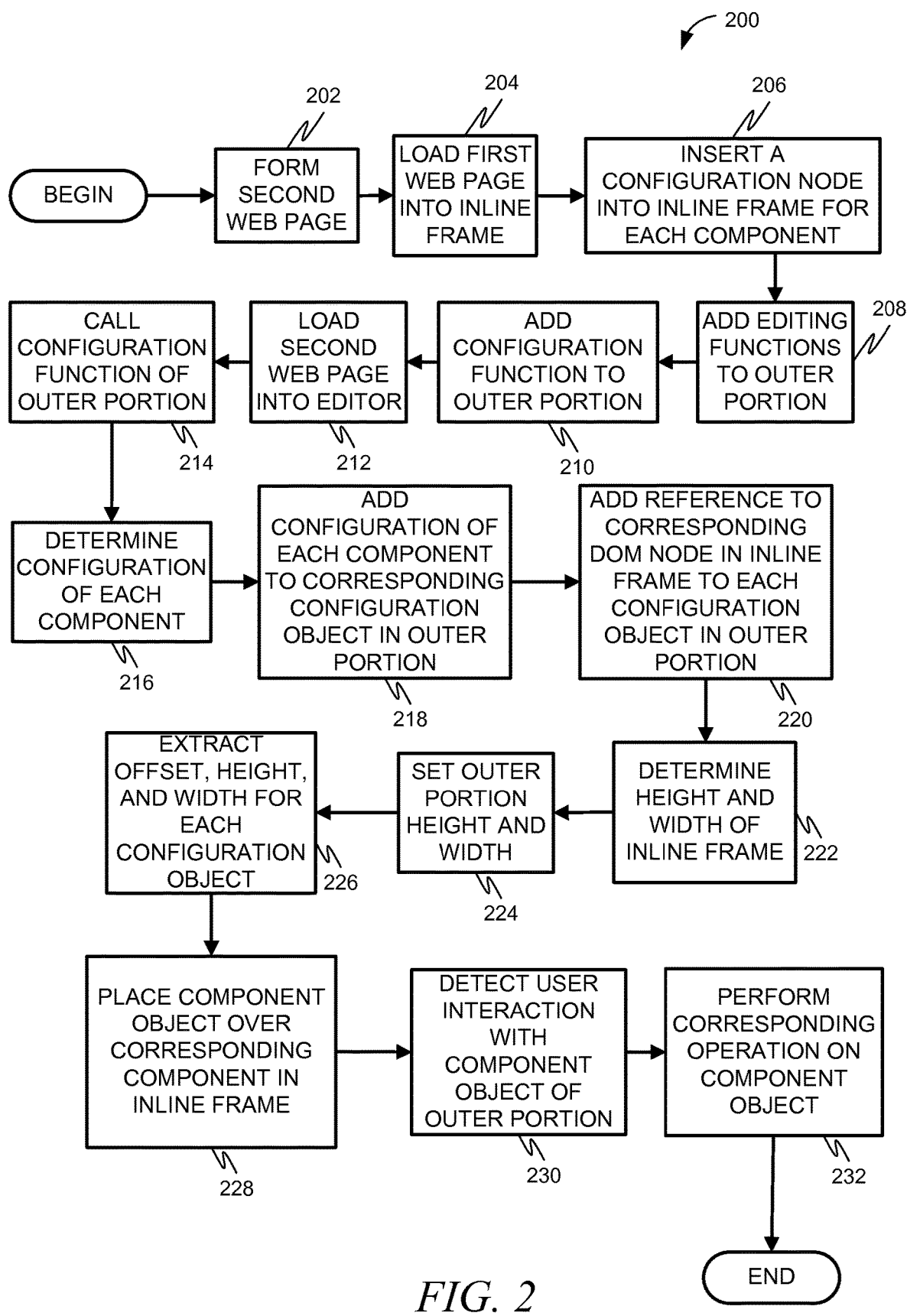
FIG. 2 is a flow diagram illustrating a method, in accordance with an example embodiment, of providing an editable version of a first web page having one or more components.

FIG. 2 is a flow diagram illustrating a method 200, in accordance with an example embodiment, of providing an editable version of a first web page having one or more components. At operation 202, a second web page is formed having an inline frame and an outer frame. At operation 204, the first web page is loaded into the inline frame of the second web page. This is performed as-is, meaning that no CSS or JavaScript pieces are changed or injected into the first web page as it is loaded into the inline frame of the second web page. Then, at 206, for each component in the first web page, a configuration node, which is an invisible child node, is inserted into a DOM element for the component in the inline frame, with the configuration node having an attached data attribute. The data attribute may contain information representing the configuration of the component. In an example embodiment, the data attribute may contain a string representation of a JavaScript object notation (JSON) object containing, for example, the URL path, editing dialog preference, user interaction permissions, and any other information about the configuration of the component that may be useful for an editing tool. At operation 208, one or more editing functions are added to the outer frame of the second web page. At operation 210, a configuration function to select configuration nodes from the inline frame of the second web page is added to the outer frame of the second web page. This function may be, for example, a querySelectorAll command in JavaScript.

At operation 212, the second web page is loaded into an editor. This editor may be, for example, a browser program that, when rendering and interacting with the second web page, permits editing functions on the second web page. At operation 214, the configuration function of the outer frame of the second web page is called, which then causes all configuration nodes to be selected. At operation 216, the configuration of each component is determined by parsing the data attribute of each of the selected configuration nodes. In an example embodiment, this may be performed through a JSON.parse command. At operation 218, for each component, the configuration of the component is added to a configuration object in the outer frame of the second web page. At operation 220, a reference to a corresponding DOM node in the inline frame of the second web page is added to each configuration object in the outer frame of the second web page.

At operation 222, the height and width of the inline frame of the second web page is determined. At operation 224, the height and width of the outer frame of the second web page is set to be the same as the height and width of the inner frame, and the outer frame is placed exactly over the inline frame. In an example embodiment, this may be performed by inserting a <div/> DOM element in the outer frame and positioning it exactly over the inline frame using the height and width of the inline frame. Thus, user interaction is prevented with the inline frame, because any interaction will be intercepted by the overlaid outer frame.

At operation 226, for each configuration object in the outer frame of the second web page, an offset, height, and width is extracted from the stored computed styling information of the browser. In an example embodiment, the offset may be measured from the top left corner of the inline frame. At operation 228, for each configuration object in the outer frame of the second web page, a component object is placed exactly over the corresponding component of the inline frame, using the offset and height and width from operation 226. This may be performed by using a <div/> DOM element for each component object.

At operation 230, user interaction is detected with a component object of the outer frame of the second web page. Notably, the user is prevented from interacting directly with the underlying component of the inline frame (corresponding to a component in the first web page). At operation 232, a corresponding operation is performed on the component object. The configuration object for the corresponding component object may contain the allowable operations for the user, and the operations themselves may then be handled completely by the outer frame using, for example, REST operations.

For instance, if the user wishes to delete a component, then he would interact with the overlay in the outer frame, which contains interaction elements (such as a delete button) in the defined editing functions. The event triggered can then execute a delete operation of the corresponding component's URL by sending this request through, for example, an XMLHttpRequest object. After the component is deleted successfully on the server, then the editing function in the outer frame will remove the DOM node from the inline frame to update the visual appearance of the website, and destroy the corresponding component object (overlay) and the configuration object in the outer frame. Other operations like updating, inserting, moving, and so forth can operate in similar manners.

Figure 3:
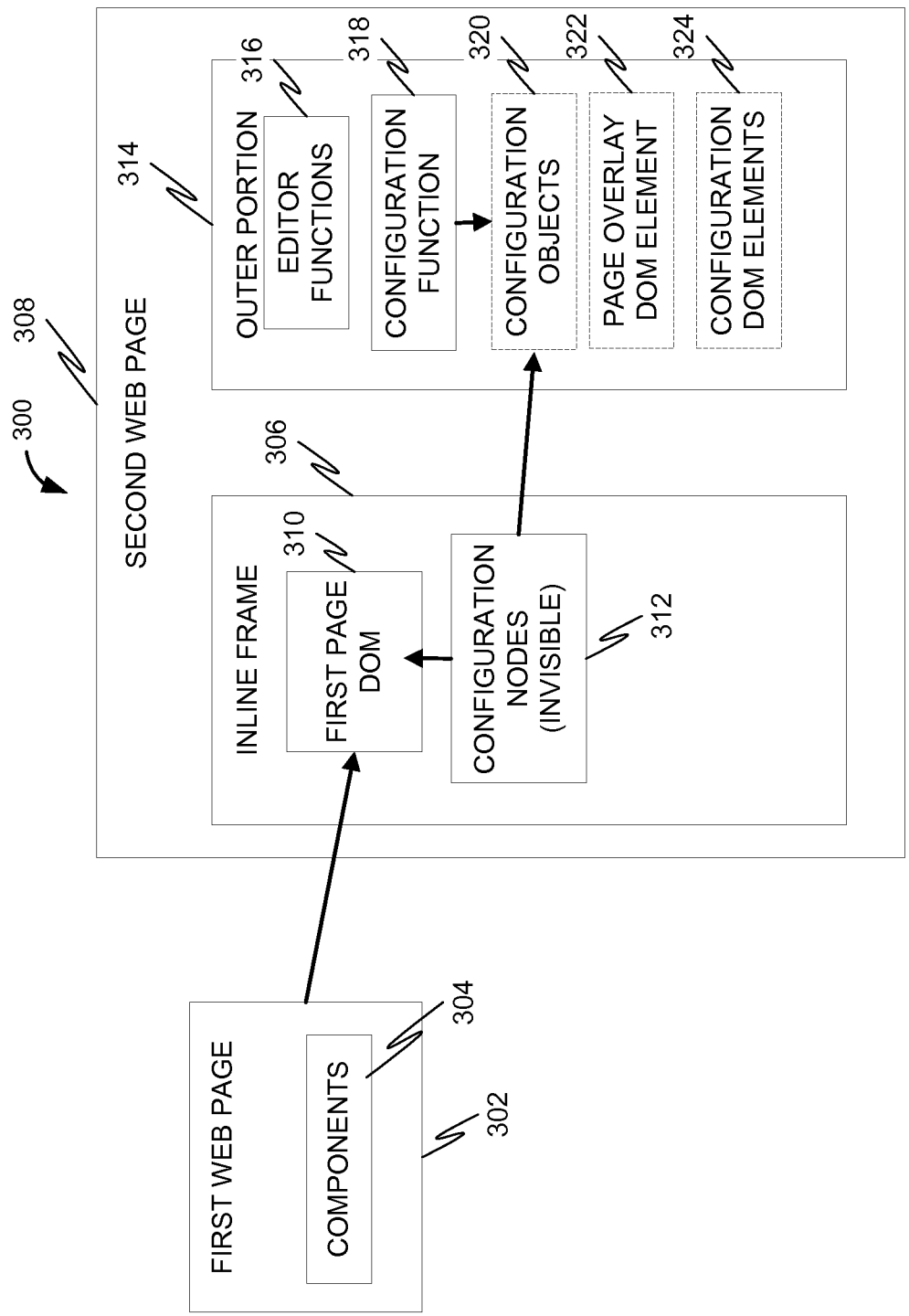
FIG. 3 is a block diagram illustrating a method, in accordance with an example embodiment, of providing an editable version of a first web page having one or more components.

FIG. 3 is a block diagram illustrating method 300, in accordance with an example embodiment, of providing an editable version of a first web page 302 having one or more components 304. The first web page 302 is inserted into an inline frame 306 of a second web page 308 as a first page DOM structure 310. Then, configuration nodes 312 are created for each of the components 304, and these configuration nodes 312 are placed as invisible child nodes of the first page DOM structure 310. An outer frame 314 may include one or more editor functions 316 and a configuration function 318. The configuration function 318 reads all the configuration nodes 312 in the first page DOM structure 310 and forms one or more corresponding configuration objects 320 in the outer frame 314. Then, a page overlay DOM element 322 is created in the outer frame 314. One or more configuration DOM elements 324 are created (one for each of the components 304). The configuration DOM elements 324 are created using the information from the configuration objects 320 so that they exactly overlay the corresponding components 304 in the first web page 302 (now in the first page DOM structure 310). Thus, when a user interacts with the second web page 308, he is actually interacting only with the outer frame 314 of the second web page 308 and, more specifically, the editor functions 316, page overlay DOM element 322, and/or configuration DOM elements 324.

Figure 4:
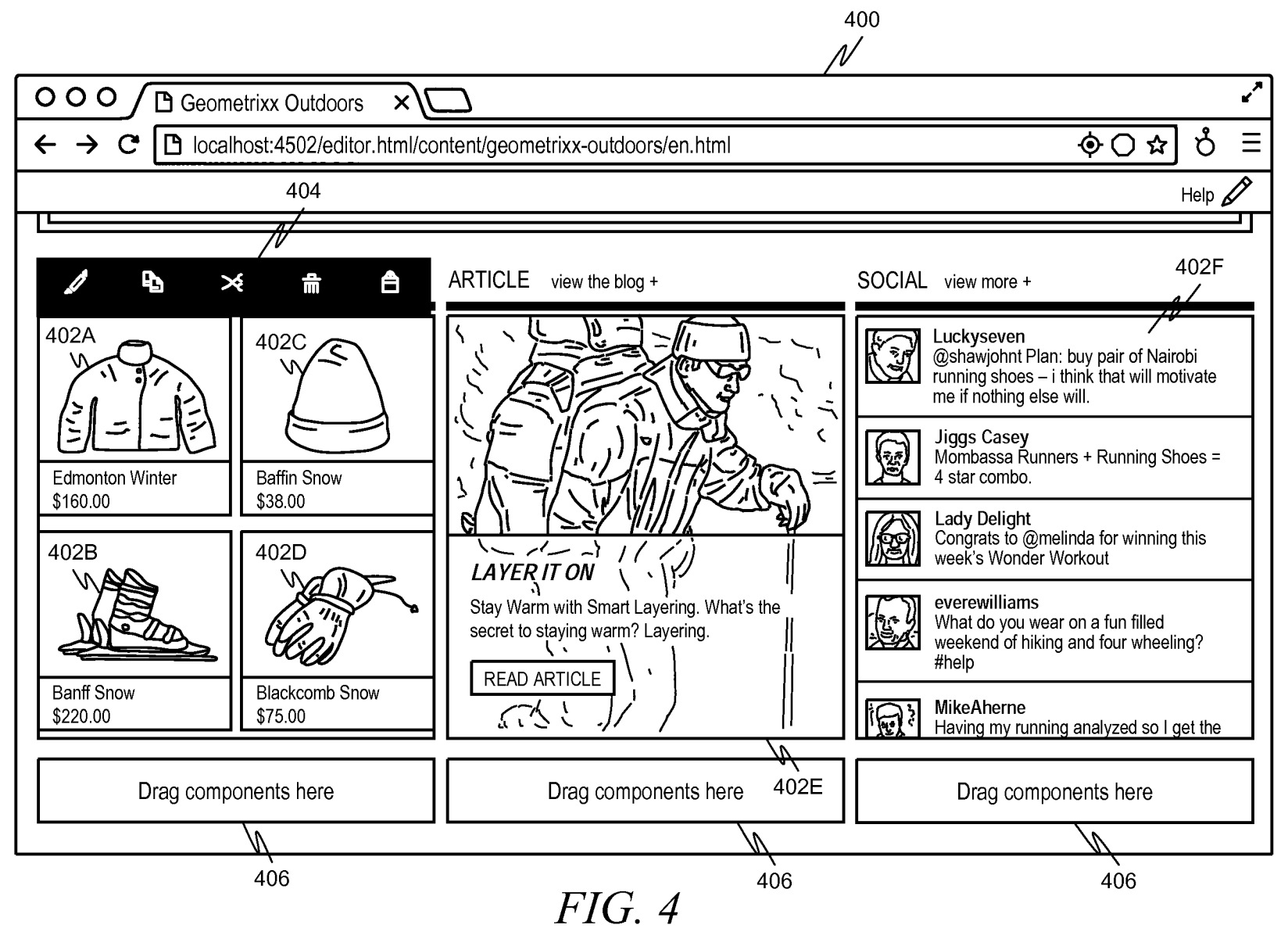

FIG. 4 is a screen capture illustrating an editable web page 400 in accordance with an example embodiment. Here, the user has chosen to be in editing mode. The web page 400 includes one or more components 402A-402F, with each component 402A-402F having an invisible overlay in an outer frame so that when a user interacts with what he thinks are the components 402A-402F, he is actually interacting with configuration objects in the outer frame. One or more editing functions 404 are also displayed. The user may, for example, select one of the components 402A-402F and then select one of the editing functions 404 to perform the desired edit. Additional editing functions 406 are also provided, depicted here as areas where additional components could be added via dragging.

Figure 5:
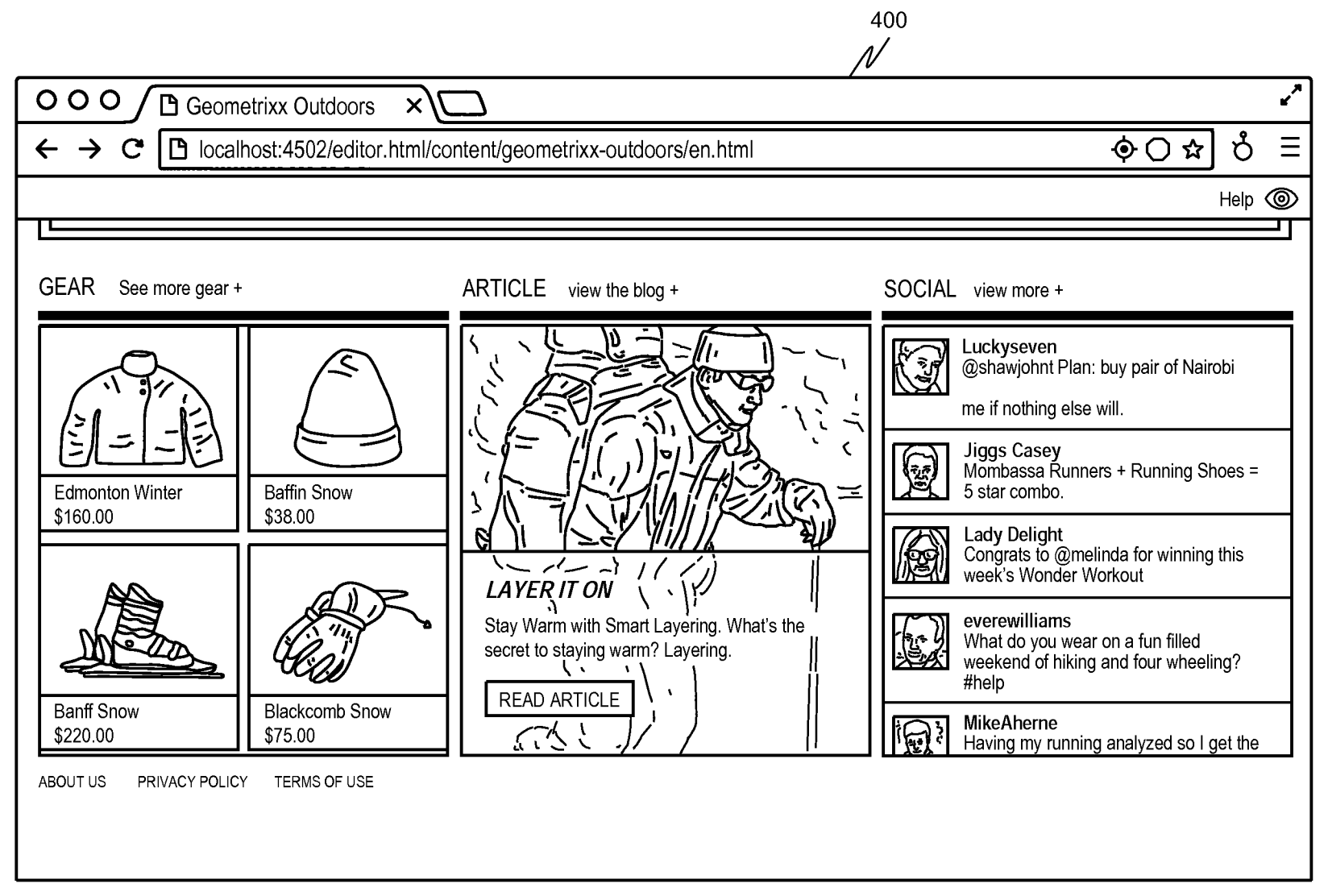

FIG. 5 is a screen capture illustrating an editable web page 400 being viewed in a non-editing mode. Notably, the editing functions 404 and 406 are not displayed, and the user is unable to interact with the overlay (the outer frame).

The following is an example <div/> DOM object added to the outer frame of the second web page, as described earlier. This is only intended as an example and is not intended to be limiting:

```
<div class="cq-overlay cq-droptarget cq-marker-start cq-placeholder"
draggable="true" data-type="Editable" data-path="/content/geometrixx-
outdoors/en/jcr:content/par/teaser_0" style="z-index: 7; top: 501px; left:
0px; width: 302px; height: 12px;"></div>
```

The following is an example data attribute attached to a configuration node of an inline frame DOM structure, as described earlier. This is only intended as an example and is not intended to be limiting:

```
<cq data-
config="{"path":"/content/geometrixx/en/jcr:content/
par/image", "dialog":"/libs/foundation/components/
image/cq:dialog","dialogLoadingMode":"newpage
","dialogSrc":"/libs/foundation/components/image/
_cq_dialog.html{+content}","type":"foundation/
components/image","csp":"homepage|page/
par|parsys/image|parbase","editConfig":{"
dropTarget":[{"id":"image","name&
quot;:"./fileReference","accept":["image/.
*"],"groups":["media"],"params&
quot;:{"./sling:resourceType":"foundation/components/
image","./imageMap":"","./
imageRotate":"","./imageCrop":"
"}}]}}"></cq>
```

Figure 6:
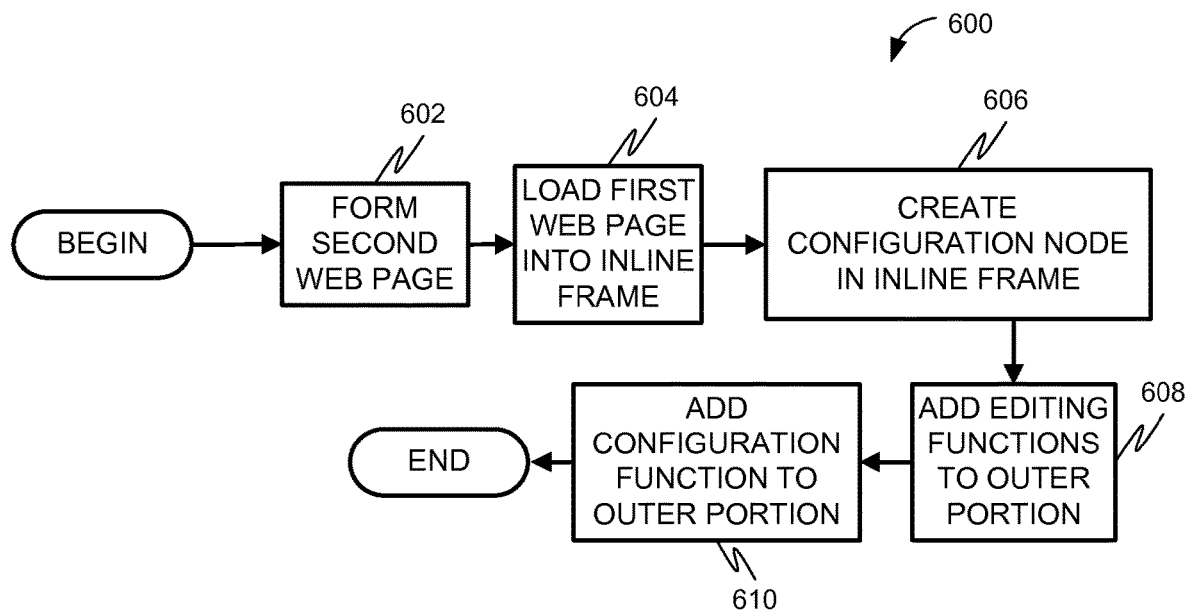
FIG. 6 is a flow diagram illustrating a method, in accordance with an example embodiment, of providing an editable version of a first web page, the first web page having one or more components.

In an example embodiment, elements of the present disclosure may be thought of as two different methods, with one performed at a web content management server and another performed at a user device. FIG. 6 is a flow diagram illustrating a method 600, in accordance with an example embodiment, of providing an editable version of a first web page, with the first web page having one or more components. This method may be performed at a web content management server, and the first web page may be stored in a content repository. At operation 602, a second web page having an inline frame and an outer frame is formed. At operation 604, the first web page is loaded into the inline frame of the second web page. At operation 606, a configuration node is created in the inline frame, with the configuration node corresponding to one of the components and having an attached data attribute with information about configuration of the corresponding component. At operation 608, one or more editing functions are added to the outer frame of the second web page. At operation 610, a configuration function is added to the outer frame of the second web page, with the configuration function designed to cause a browser rendering the second web page to select all configuration nodes in the inline frame of the second web page and create corresponding component objects in the outer frame of the second web page. The component objects are placed exactly over corresponding components in the inline frame such that user attempts at interaction with the corresponding components are intercepted by the component objects, and the creation of the corresponding component objects utilizes the information about configuration of the corresponding components in the attached data attributes of the configuration nodes in the inline frame.

Figure 7:
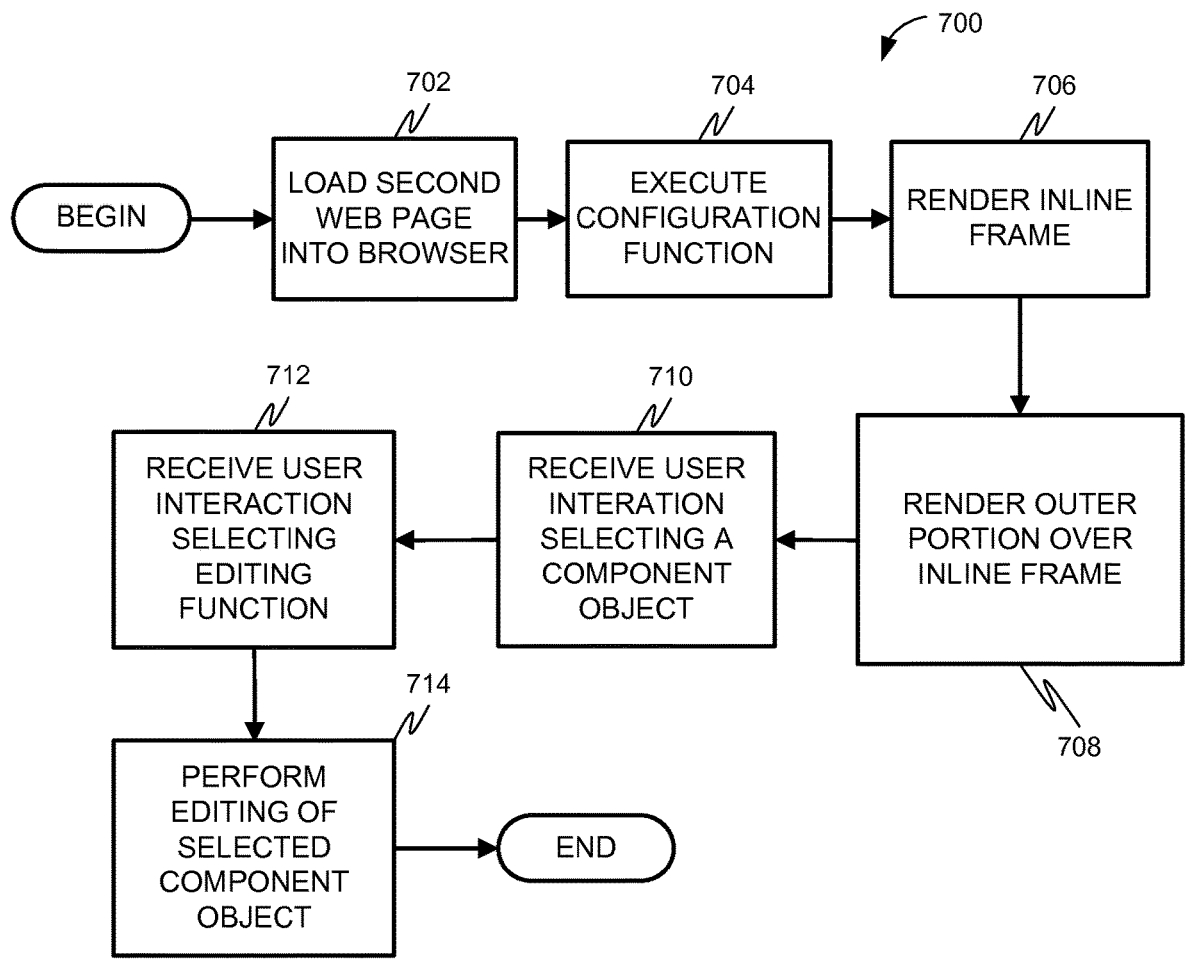
FIG. 7 is a flow diagram illustrating a method, in accordance with another example embodiment, of editing a first web page, the first web page having one or more components.

FIG. 7 is a flow diagram illustrating a method 700, in accordance with another example embodiment, of editing a first web page, with the first web page having one or more components. At operation 702, a second web page is loaded into a browser. The second web page has an inline frame and an outer frame, and the inline frame contains the first web page and one or more configuration nodes. The one or more configuration nodes each have an attached data attribute with information about configuration of a corresponding component, with the outer frame containing one or more editing functions and a configuration function. At operation 704, the configuration function is executed, causing a component object to be created in the outer frame for each configuration node in the inline frame using the information about configuration of corresponding components in the attached data attributes of the one or more configuration nodes, wherein each component object in the outer frame is placed exactly over a corresponding component in the inline frame.

At operation 706, the inline frame is rendered. At operation 708, the outer frame is rendered over the inline frame. At operation 710, user interaction selecting a component object of the rendered outer frame is received. At operation 712, user interaction selecting an editing function in the rendered outer frame is received. At operation 714, editing of the selected component object in accordance with the selected editing function is performed, with the editing causing modification of the component object in the outer frame without affecting a corresponding component in the inline frame.

Figure 8:
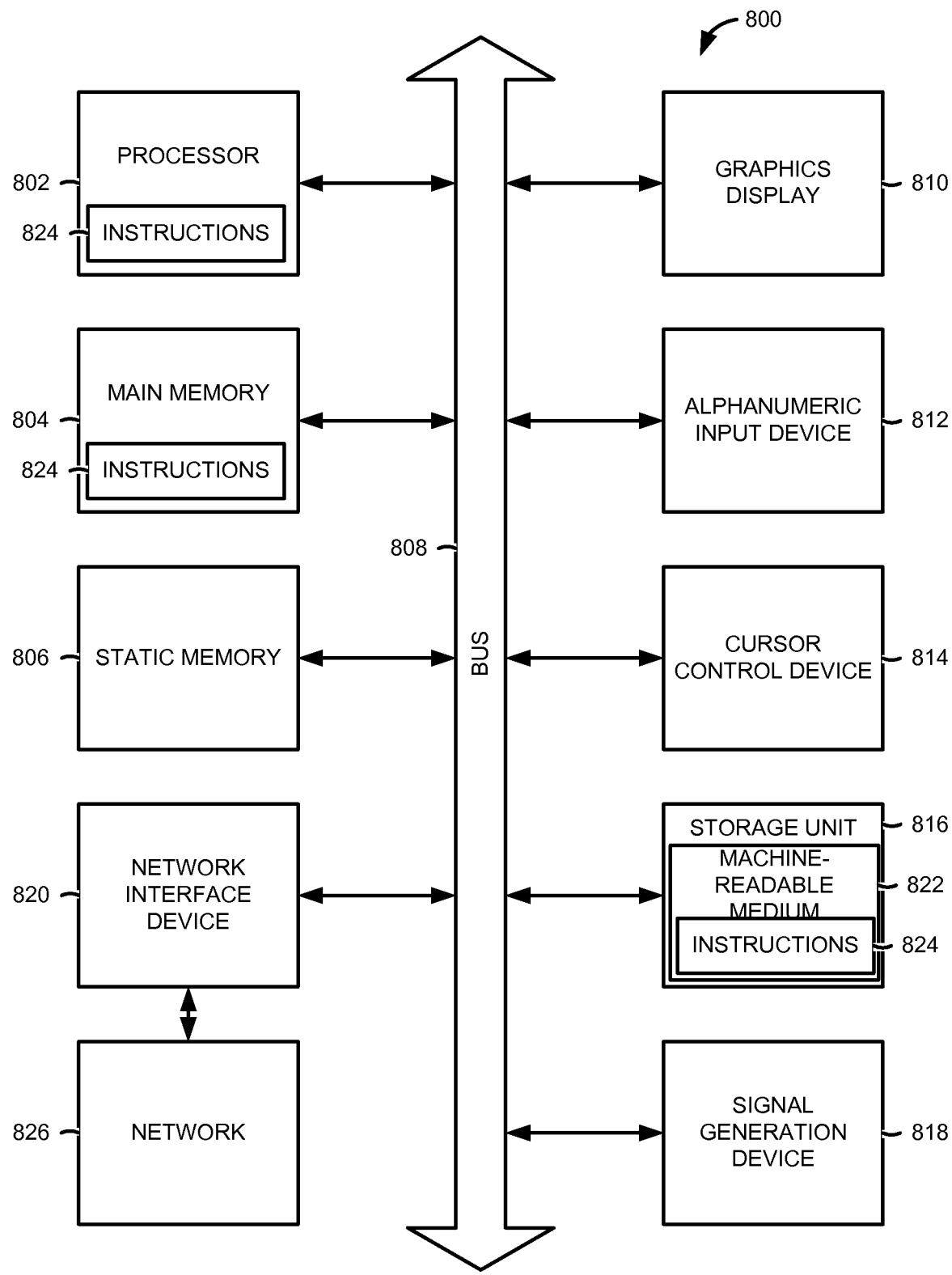
FIG. 8 is a block diagram of a computer processing system at a server system, within which a set of instructions may be executed for causing the computer to perform any one or more of the methodologies discussed herein.

FIG. 8 is a block diagram of a computer processing system 800 at a server system, within which a set of instructions may be executed for causing the computer to perform any one or more of the methodologies discussed herein.

Example embodiments may also, for example, be deployed by Software-as-a-Service (SaaS), application service provider (ASP), or utility computing providers, in addition to being sold or licensed via traditional channels. The computer may be a server computer, a PC, a tablet PC, a set-top box (STB), a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 800 includes processor 802 (e.g., a central processing unit (CPU), a GPU, or both), main memory 804, and static memory 806, which communicate with each other via bus 808. The processing system 800 may further include graphics display unit 810 (e.g., a plasma display, a liquid crystal display (LCD), or a cathode ray tube (CRT)). The processing system 800 also includes alphanumeric input device 812 (e.g., a keyboard), a cursor control device 814 (e.g., a mouse, touch screen, or the like), a storage unit 816, a signal generation device 818 (e.g., a speaker), and a network interface device 820.

The storage unit 816 includes machine-readable medium 822 on which is stored one or more sets of instructions 824 and data structures (e.g., software) embodying or utilized by any one or more of the methodologies or functions described herein. The instructions 824 may also reside, completely or at least partially, within the main memory 804 and/or within the processor 802 during execution thereof by the processing system 800, with the main memory 804 and the processor 802 also constituting machine-readable, tangible media.

The instructions 824 may further be transmitted or received over network 826 via a network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding, or carrying a set of instructions for execution by the computer and that cause the computer to perform any one or more of the methodologies of the present application, or that is capable of storing, encoding, or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

What is claimed is:

1. A method of providing an editable version of a first web page, comprising:
   forming a second web page and loading a representative structure of the first web page within an inline frame of the second web page, the first web page having at least one component, each of the at least one component being loaded in the inline frame;
   inserting a configuration node for each of the at least one component into the representative structure, wherein each configuration node is associated with a data attribute that represents a configuration of its corresponding component;
   adding to an outer frame of the second web page, for each of the at least one component loaded in the inline frame, a corresponding configuration object;
   adding to each configuration object in the outer frame a reference to a corresponding one of the configuration nodes in the inner frame;
   providing on the outer frame, for each added configuration object, a component element with identical dimensions as, and placed over, its corresponding component loaded in the inline frame, each component element configured to prevent direct interaction with its corresponding component in the inline frame;
   responsive to a user interaction with one of the component elements in the outer frame to perform a modification to a corresponding one of the at least one component of the first web page, performing the modification to the first web page; and
   responsive to performing the modification to the first web page, utilizing the reference in the configuration object in the outer frame to modify the corresponding one of the configuration nodes in the inner frame.

2. The method of claim 1, wherein the forming of the second web page does not involve modification or injection of scripts or style sheet pieces in the first webpage.

3. The method of claim 1, wherein the data attribute that represents the configuration of its corresponding component includes a path for its corresponding component.

4. The method of claim 1, wherein the data attribute that represents the configuration of its corresponding component includes editing dialog preferences for its corresponding component.

5. The method of claim 1, wherein the data attribute that represents the configuration of its corresponding component includes user interaction permissions of its corresponding component.

6. The method of claim 1, further comprising:
adjusting an outer frame of the second web page in accordance with dimensions of the inline frame.

7. A method of executing a browser to edit a first web page, the method comprising:
loading a second web page into a browser, the second web page having both an inline frame that contains a representative structure of the first web page, and an outer frame containing one or more editing functions and a configuration function, wherein the first web page has at least one component, each of the at least one component including a corresponding configuration node created in the inline frame and associated with a data attribute that represents a configuration of the component, and wherein the outer frame has a corresponding configuration object for each of the at least one component of the first web page, and wherein each configuration object in the outer frame includes a reference to the corresponding configuration node in the inline frame;
in response to executing the configuration function, causing a component element to be created in the outer frame for each configuration object, each component element being created with identical dimensions as, and positioned over its corresponding component in the inline frame to prevent direct interaction with its corresponding component in the inline frame;
rendering the inline frame;
rendering the outer frame over the inline frame;
responsive to a user interaction with one of the component elements in the outer frame to perform a modification to a corresponding one of the at least one component of the first web page, using a corresponding one of the editing functions in the outer frame to perform the modification to the first web page; and
responsive to performing the modification to the first web page, utilizing the corresponding editing function in the outer frame to modify the corresponding one of the configuration nodes in the inner frame.

8. The method of claim 7, wherein the executing the configuration function includes, for each configuration node in the inline frame, determining a height, width, and offset of the corresponding component and creating the corresponding component element in the outer frame at the same height, width, and offset.

9. The method of claim 7, wherein the outer frame is rendered over the inline frame in response to executing the configuration function, such that dimensions of the outer frame are identical to dimensions of the inner frame.

10. A web content management server comprising:
a processor;
a memory;
a content repository containing a first web page, the first webpage having at least one component; and
a web content management module executable by the processor and configured to:
form a second web page having a representative structure of the first web page within an inline frame, the representative structure corresponding to each component of the first web page;
insert a configuration node for each component in the representative structure of the inline frame, each configuration node associated with a data attribute;
create an outer frame of the second web page;
add to the outer frame, for each component of the first web page, a corresponding configuration object;
add to each configuration object in the outer frame a reference to a corresponding configuration node in the inline frame, wherein the outer frame is configured to cause a browser to create, for each configuration object of the outer frame, a corresponding component element with identical dimensions as, and placed over, its corresponding component in the inline frame, each component element configured to prevent direct interaction with its corresponding component in the inline frame;
responsive to a user interaction with one of the component elements in the outer frame to perform a modification to a corresponding one of the at least one component of the first web page, perform the modification to the first web page; and
responsive to performing the modification to the first web page, utilize the reference in the configuration object in the outer frame to modify the corresponding one of the configuration nodes in the inner frame.

11. The web content management server of claim 10, wherein the web content management module is further configured to:
add at least one editing function to the outer frame of the second web page; and
add a configuration function to the outer frame of the second web page, the configuration function being designed to cause the browser to create the corresponding component elements in the outer frame of the second web page based at least in part on the configuration nodes of the first web page.

12. The web content management server of claim 11, wherein the data attribute includes a path for the corresponding component.

13. The web content management server of claim 11, wherein the data attribute includes editing dialog preferences for the corresponding component.

14. The web content management server of claim 11, wherein the data attribute includes user interaction permissions of the corresponding component.

15. The web content management server of claim 10, wherein the forming of the second web page does not involve modification or injection of scripts or style sheet pieces in the first web page as it is loaded into the inline frame.

16. The web content management server of claim 10, wherein the web content management server is in communication with the browser, the browser being configured to:
load the second web page, the second web page having the inline frame and the outer frame, the inline frame containing the first web page, the outer frame containing at least one editing function and a configuration function;
execute the configuration function, and cause the creation of the component elements for each configuration object of the outer frame;
render the inline frame; and
render the outer frame over the inline frame.

17. The web content management server of claim 10, wherein the outer frame of the second web page is created to have the same dimensions as the inner frame and is positioned in-line therewith.

* * * * *